United States Patent
Horng et al.

(10) Patent No.: US 8,159,164 B2
(45) Date of Patent: Apr. 17, 2012

(54) VARIABLE-DELAY-TIME CONTROL SYSTEM FOR A MOTOR

(75) Inventors: Alex Horng, Kaohsiung (TW); Hsin-Nan Lin, Kaohsiung (TW); Chien-Heng Peng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 388 days.

(21) Appl. No.: 12/484,408

(22) Filed: Jun. 15, 2009

(65) Prior Publication Data
US 2010/0213883 A1    Aug. 26, 2010

(30) Foreign Application Priority Data
Feb. 20, 2009    (TW) ................................ 98105517 A

(51) Int. Cl.
*H02P 23/12*    (2006.01)
(52) U.S. Cl. ......... 318/400.14; 318/400.02; 318/400.16; 388/806; 388/830; 342/388; 342/391
(58) Field of Classification Search ............. 318/400.02, 318/400.14, 400.16; 388/806, 830; 342/388, 342/391
See application file for complete search history.

(56) References Cited

U.S. PATENT DOCUMENTS

| | | | | | |
|---|---|---|---|---|---|
| 2,778,011 | A | * | 1/1957 | Frank | 342/388 |
| 2,778,012 | A | * | 1/1957 | Crist | 342/391 |
| 4,479,079 | A | * | 10/1984 | Hanner | 388/830 |
| 5,317,241 | A | * | 5/1994 | Hans | 318/400.16 |
| 5,761,375 | A | * | 6/1998 | Naito | 388/806 |
| 5,796,194 | A | * | 8/1998 | Archer et al. | 310/68 B |
| RE37,825 | E | * | 9/2002 | Hans | 318/400.16 |
| RE38,264 | E | * | 10/2003 | Hans | 318/400.16 |
| 6,972,534 | B1 | * | 12/2005 | Schulz et al. | 318/400.02 |
| 7,421,301 | B2 | * | 9/2008 | Schulz et al. | 700/1 |
| 2006/0050831 | A1 | * | 3/2006 | Schulz et al. | 375/377 |

* cited by examiner

*Primary Examiner* — Paul Ip
(74) *Attorney, Agent, or Firm* — WPAT, P.C.; Anthony King

(57) ABSTRACT

A variable-delay-time control system for a motor is provided. The system includes a control unit, a driving unit, and a motor. The control unit is used to output at least one control signal according to at least one predetermined signal, and the control signal has a variable delay time. The driving unit is connected to the control unit, and is used to receive the control signal and generate a driving signal. The motor is connected to the driving unit, and conduction time of the motor is controlled according to the driving signal and the variable delay time. With the variable-delay-time control system of the present invention, the delay time of the control signal is variable, so the motor can operate at a high efficiency (for example, at a reduced current). Moreover, as the variable-delay time can be adjusted according to the predetermined signal, the motor can operate at a high efficiency in different operating states, thus improving the overall efficiency of the motor.

11 Claims, 3 Drawing Sheets

VARIABLE-DELAY-TIME CONTROL SYSTEM FOR A MOTOR

BACKGROUND OF THE INVENTION

1. Field of the Invention

The present invention relates to a motor control system, and more particularly, to a variable-delay-time control system for a motor.

2. Description of the Related Art

In a conventional motor control system, for a motor with a fixed rotation speed, a sensing element may be disposed at a fixed position to enable the motor to operate at high efficiency. However, for a motor with multiple rotation speeds, the sensing element at the fixed position cannot enable the motor to operate at high efficiency at all rotation speeds. In addition, to facilitate the commutation, control signals of some transistors may be delayed by a fixed time, and as the delay time is fixed, the motor with multiple rotation speeds cannot operate at high efficiency at different rotation speeds.

Moreover, as the motor may operate in various operating states (for example, different temperatures or difference voltages), a fixed delay time also cannot enable the motor to operate at high efficiency in different operating states.

Therefore, it is necessary to provide a variable-delay-time control system for a motor to solve the above problem.

SUMMARY OF THE INVENTION

The present invention provides a variable-delay-time control system for a motor. The system includes a control unit, a driving unit, and a motor. The control unit is used to output at least one control signal according to at least one predetermined signal, and the control signal has a variable delay time. The driving unit is connected to the control unit, and used to receive the control signal and generate a driving signal. The motor is connected to the driving unit, and a conduction time of the motor is controlled according to the driving signal and the variable delay time.

With the variable-delay-time control system of the present invention, the delay time of the control signal is variable, so the motor can operate at a high efficiency (for example, at a reduced current). Moreover, as the variable delay time can be adjusted according to the predetermined signal, the motor can operate at a high efficiency in different operating states, thus improving the overall efficiency of the motor.

DETAILED DESCRIPTION OF THE INVENTION

Figure 1:
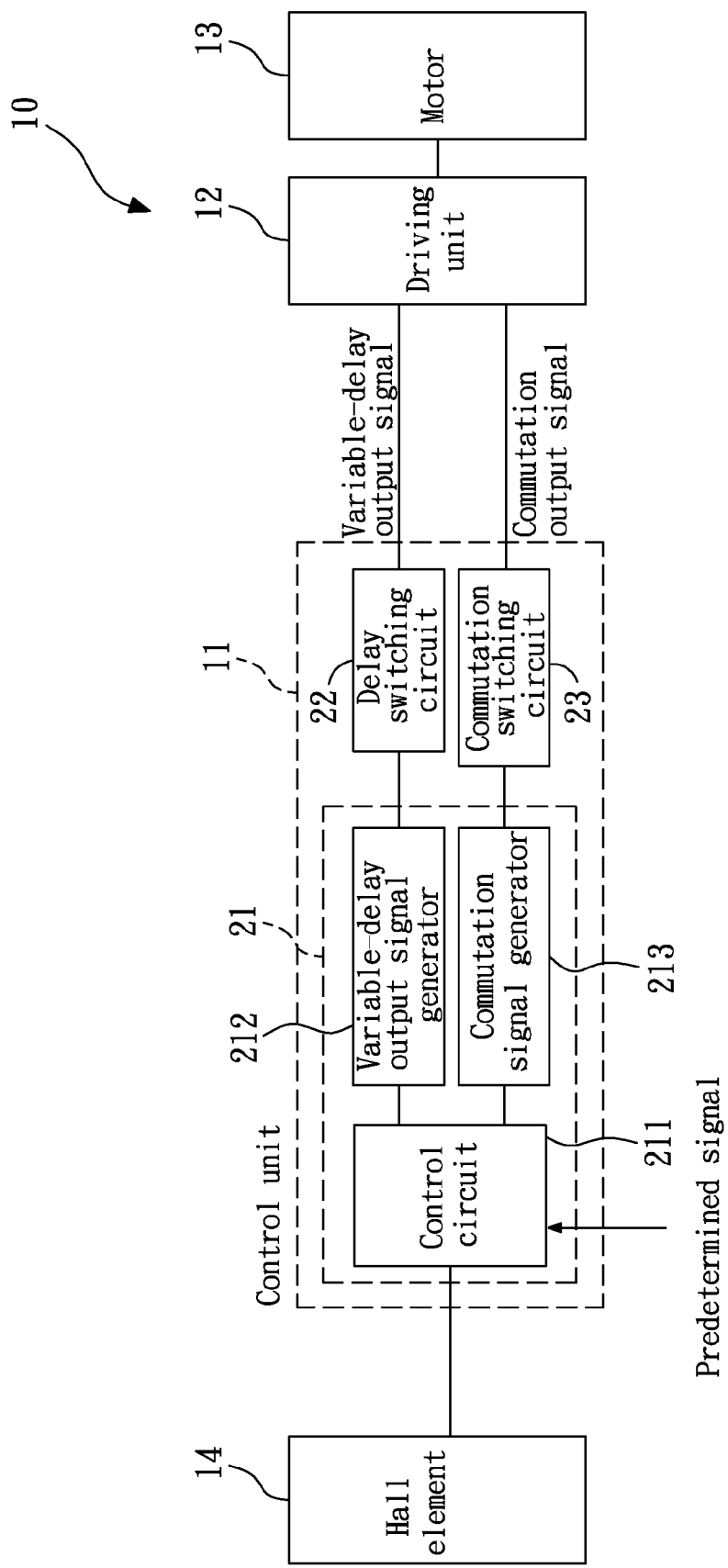
FIG. 1 is a schematic block diagram of a variable-delay-time control system for a motor according to the present invention.

FIG. 1 is a schematic block diagram of a variable-delay-time control system for a motor according to the present invention. Referring to FIG. 1, a variable-delay-time control system 10 for a motor of the present invention includes a control unit 11, a driving unit 12, and a motor 13. The control unit 11 is used to output at least one control signal according to at least one predetermined signal, and the control signal has a variable delay time. The driving unit 12 is connected to the control unit 11, and used to receive the control signal and generate a driving signal. The motor 13 is connected to the driving unit 12, and a conduction time of the motor 13 is controlled according to the driving signal and the variable delay time.

The control unit 11 includes a control circuit 211, a variable-delay output signal generator 212, and a commutation signal generator 213. The variable-delay output signal generator 212 is used to generate at least one variable-delay output signal (referring to P1 and P2 in FIG. 2). The commutation signal generator 213 is used to generate at least one commutation signal (referring to N1 and N2 in FIG. 2). The control circuit 211, the variable-delay output signal generator 212, and the commutation signal generator 213 may be individual circuits, and may also form a control apparatus 21. The control apparatus 21 may be a microcontroller.

The control unit 11 further includes a delay switching circuit 22 and a commutation switching circuit 23. The delay switching circuit 22 is connected to the variable-delay output signal generator 212 and is used to receive the variable-delay output signal and generate at least one variable-delay control signal. The commutation switching circuit 23 is connected to is the commutation signal generator 213 and is used to receive the commutation signal and generate at least one commutation control signal.

The variable-delay-time control system 10 for a motor of the present invention further includes a Hall element 14 connected to the control unit 11. In this embodiment, the predetermined signal is a pulse width modulation (PWM) signal, and the control unit 11 adjusts the variable delay time according to the PWM signal. In other applications, the predetermined signal is a temperature signal or voltage signal, and the control unit 11 adjusts the variable delay time according to the temperature signal or voltage signal.

Figure 2:
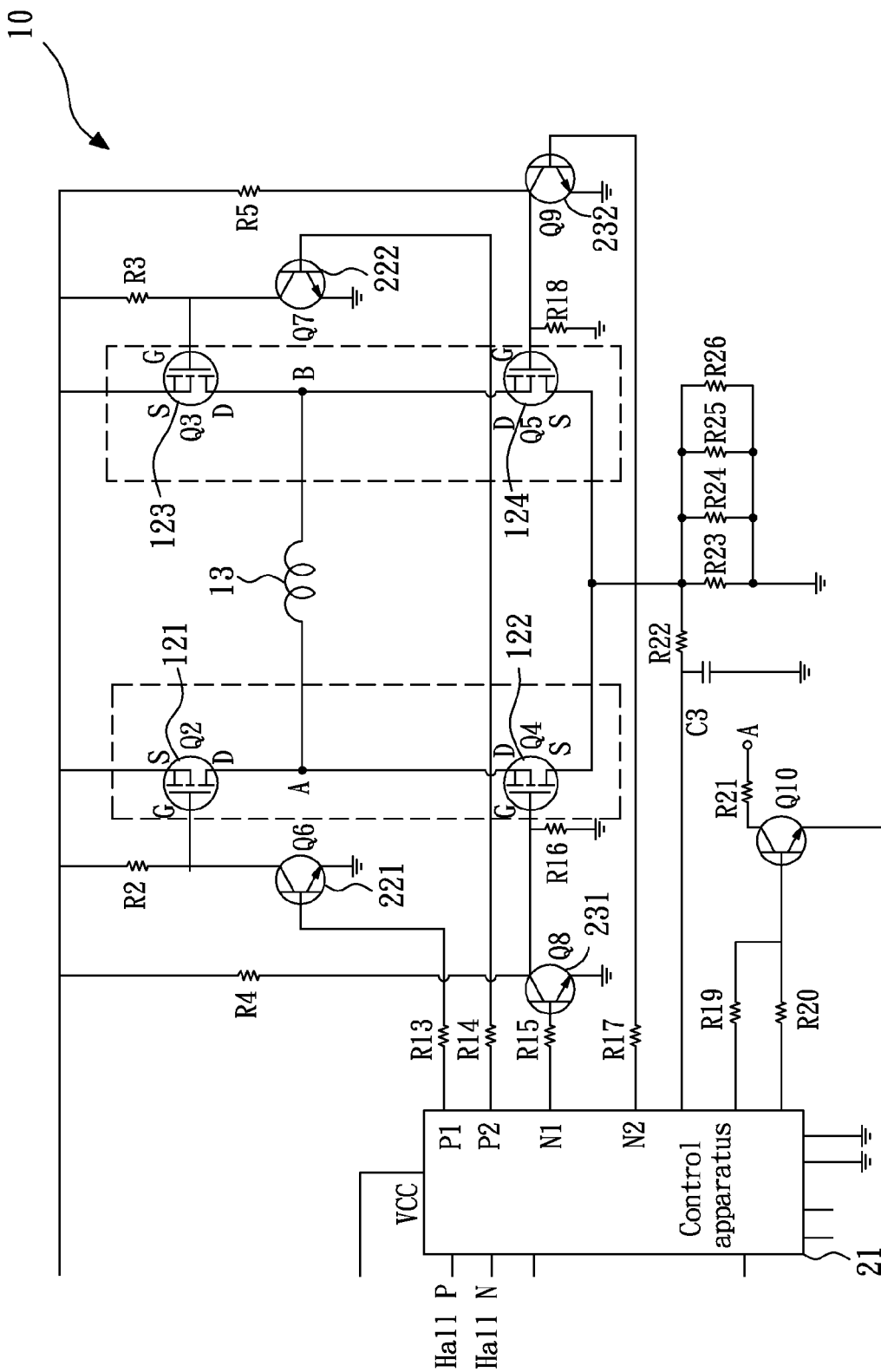
FIG. 2 is a schematic circuit diagram of the variable-delay-time control system for a motor according to the present invention.

FIG. 2 is a schematic circuit diagram of the variable-delay-time control system for a motor according to the present invention. Referring to FIG. 2, the driving unit 12 of the variable-delay-time control system 10 for a motor of the present invention includes a first transistor 121, a second transistor 122, a third transistor 123, and a fourth transistor 124. The first transistor 121 is connected in series with the second transistor 122 and has a first connection point A. The third transistor 123 is connected in series with the fourth transistor 124 and has a second connection point B. The third transistor 123 and the fourth transistor 124 connected in series are connected in parallel to the first transistor 121 and the second transistor 122 connected in series. The motor 13 (represented by a motor coil in FIG. 2) is disposed between the first connection point A and the second connection point B. In this embodiment, the motor is a fan motor, and the motor coil is a fan motor coil.

In this embodiment, the control unit 11 outputs two variable-delay control signals and two commutation control signals, a first variable-delay control signal controls the first transistor 121, a second variable-delay control signal controls the third transistor 123, a first commutation control signal controls the second transistor 122, and a second commutation control signal controls the fourth transistor 124.

Referring to FIGS. 1 and 2, the delay switching circuit 22 includes a first delay switching transistor 221 and a second delay switching transistor 222, for providing the first variable-delay control signal and the second variable-delay control signal to the first transistor 121 and the third transistor 123, respectively. The commutation switching circuit 23 includes a first commutation switching transistor 231 and a second commutation switching transistor 232, for providing the first commutation control signal and the second commutation control signal to the second transistor 122 and the fourth transistor 124, respectively.

Figure 3:
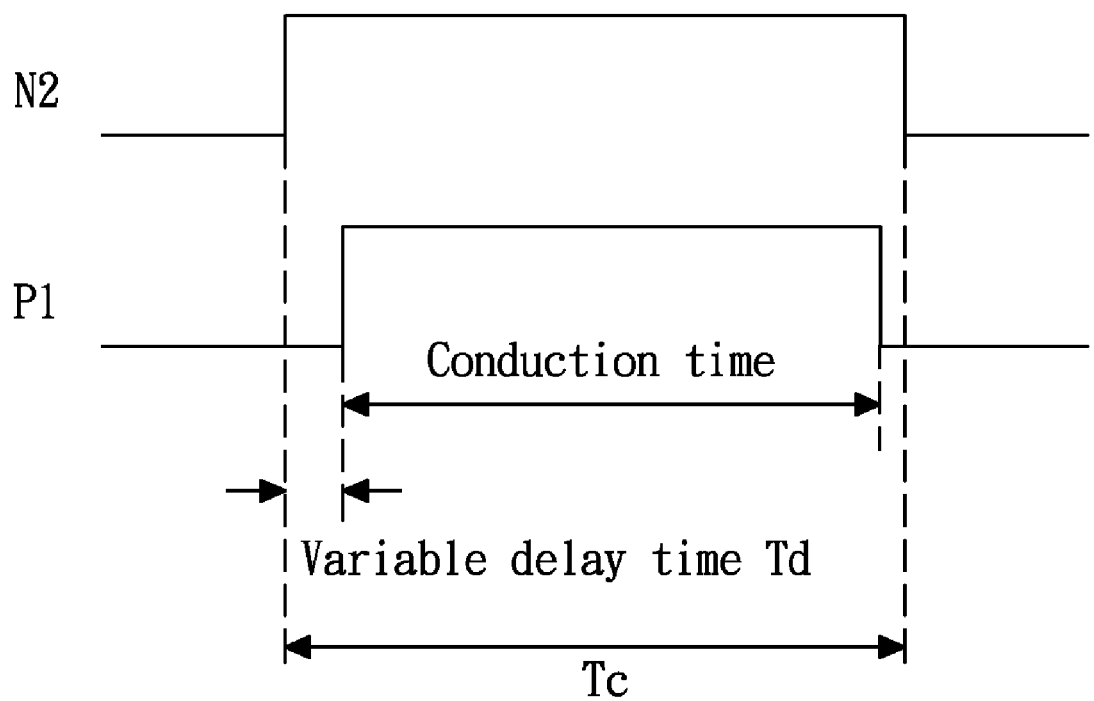
FIG. 3 is timing diagram of control signals according to an embodiment of the present invention.

FIG. 3 is timing diagram of control signals according to an embodiment of the present invention. Referring to FIGS. 2 and 3, in this embodiment, the first variable-delay output signal P1 has a variable delay time, and is delayed by the variable delay time Td corresponding to the second commutation signal N2. Therefore, the first variable-delay control signal also has a variable delay time, and is also delayed by the variable delay time Td corresponding to the second commutation output signal, such that a conduction time of the first transistor 121 is delayed by the variable delay time Td corresponding to that of the fourth transistor 124. FIG. 3 schematically shows the conduction time and the variable delay time of the first variable-delay output signal P1 and the second commutation signal N2, and an actual high/low potential relation depending upon actual circuit conditions.

Likewise, the second variable-delay control signal may also have a variable delay time, such that a conduction time of the third transistor 123 is delayed by the variable delay time corresponding to that of the second transistor 122. In addition, a variable delay ratio is defined, which is a ratio of the variable delay time (Td) to an original conduction time (Tc). The original conduction time Tc is conduction time before the delay.

Table 1 is a comparison table of different variable delay ratios. When the variable delay ratio is 5%, the corresponding rotation speed is approximately the same as that when the variable delay ratio is 2%, but current consumption is reduced to 0.47 A, i.e., reduced by about 4.1%. When the variable delay ratio is 15%, the corresponding rotation speed is also approximately the same as that when the variable delay ratio is 2%, but current consumption is reduced to 0.39 A, i.e., reduced by about 20%. That is, when the variable delay time of the control signal is prolonged, current consumption can be reduced without affecting rotation speed, thus improving efficiency. Therefore, the variable delay ratio may be 2% to 20%, and preferably 15% to 20%.

TABLE 1

| Variable delay ratio | Conduction cycle | Rotation speed (rpm) | Current (A) | Current difference |
| --- | --- | --- | --- | --- |
| 2% | 50% | 5851 | 0.49 | |
| 5% | 50% | 5850 | 0.47 | 4.1% |
| 15% | 50% | 5850 | 0.39 | 20% |

Therefore, with the variable-delay-time control system of the present invention, the delay time of the control signal is variable, so the motor can operate at a high efficiency (for example, at a reduced current). Moreover, as the variable delay time can be adjusted according to the predetermined signal, the motor can operate at a high efficiency in different operating states, thus improving the overall efficiency of the motor.

While the embodiment of the present invention have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications that maintain the spirit and scope of the present invention are within the scope as defined in the appended claims.

What is claimed is:

1. A variable-delay-time control system for a motor, comprising:
   a control unit, outputting at least one control signal according to at least one predetermined signal, wherein the control signal has a variable delay time;
   a driving unit, connected to the control unit, for receiving the control signal and generating a driving signal; and
   a motor, connected to the driving unit, wherein a conduction time of the motor is controlled according to the driving signal and the variable delay time;
   wherein the control unit comprises a control circuit, a variable-delay output signal generator, and a commutation signal generator; the variable-delay output signal generator is used to generate at least one variable-delay output signal, and the commutation signal generator is used to generate at least one commutation signal.

2. The system according to claim 1, wherein the control unit further comprises a delay switching circuit and a commutation switching circuit, the delay switching circuit is connected to the variable-delay output signal generator and used to receive the variable-delay output signal and generate at least one variable-delay control signal, and the commutation switching circuit is connected to the commutation signal generator and used to receive the commutation signal and generate at least one commutation control signal.

3. The system according to claim 2, wherein the driving unit comprises a first transistor, a second transistor, a third transistor, and a fourth transistor; the first transistor is connected in series with the second transistor and has a first connection point, the third transistor is connected in series with the fourth transistor and has a second connection point, and the third transistor and the fourth transistor connected in series are connected in parallel to the first transistor and the second transistor connected in series; and the motor is disposed between the first connection point and the second connection point.

4. The system according to claim 3, wherein the control unit outputs two variable-delay control signals and two commutation control signals, a first variable-delay control signal controls the first transistor, a second variable-delay control signal controls the third transistor, a first commutation control signal controls the second transistor, and a second commutation control signal controls the fourth transistor.

5. The system according to claim 4, wherein the first variable-delay control signal has a variable delay time, such that conduction time of the first transistor is delayed by the variable delay time corresponding to that of the fourth transistor.

6. The system according to claim 4, wherein the second variable-delay control signal has a variable delay time, such that a conduction time of the third transistor is delayed by the variable delay time corresponding to that of the second transistor.

7. The system according to claim 4, wherein the delay switching circuit comprises a first delay switching transistor and a second delay switching transistor, for providing the first variable-delay control signal and the second variable-delay control signal, respectively; and the commutation switching circuit comprises a first commutation switching transistor and a second commutation switching transistor, for providing the first commutation control signal and the second commutation control signal, respectively.

8. The system according to claim 1, wherein the predetermined signal is a pulse width modulation (PWM) signal, and the variable delay time is adjusted according to the PWM signal.

9. The system according to claim 1, wherein the predetermined signal is a temperature signal or voltage signal, and the variable delay time is adjusted according to the temperature signal or voltage signal.

10. The system according to claim 1, further comprising a Hall element connected to the control unit.

11. The system according to claim 1, wherein the motor is a fan motor.

\* \* \* \* \*